US012761863B2

(12) United States Patent
Chiavassa et al.

(10) Patent No.: US 12,761,863 B2
(45) Date of Patent: Oct. 13, 2026

(54) STATELESS PLAYBACK FOR COLLABORATIVE MEDIA CONSUMPTION

(71) Applicant: Spotify AB, Stockholm (SE)

(72) Inventors: Maximiliano Carlos Chiavassa, Barcelona (ES); Radosław Oskar Miazio, London (GB); Manish Kumar Mishra, Berlin (DE)

(73) Assignee: Spotify AB, Stockholm (SE)

( * ) Notice: Subject to any disclaimer, the term of this patent is extended or adjusted under 35 U.S.C. 154(b) by 399 days.

(21) Appl. No.: 18/494,116

(22) Filed: Oct. 25, 2023

(65) Prior Publication Data

US 2025/0138777 A1 May 1, 2025

(51) Int. Cl.
*G06F 3/16* (2006.01)
*H04L 65/61* (2022.01)

(52) U.S. Cl.
CPC .............. *G06F 3/165* (2013.01); *H04L 65/61* (2022.05)

(58) Field of Classification Search
CPC ...... G06F 3/165; G06F 16/639; G06F 16/686; H04L 65/61; H04N 21/47217
See application file for complete search history.

(56) References Cited

U.S. PATENT DOCUMENTS

| | | | | |
|---|---|---|---|---|
| 7,996,566 | B1 * | 8/2011 | Sylvain | H04N 7/15 715/201 |
| 10,382,511 | B2 | 8/2019 | Archambault et al. | |
| 2011/0082902 | A1 * | 4/2011 | Rottler | H04W 8/245 709/204 |
| 2015/0067054 | A1 | 3/2015 | Yoo et al. | |
| 2021/0329332 | A1 | 10/2021 | MacKay et al. | |
| 2021/0392402 | A1 | 12/2021 | Patricks | |
| 2022/0188066 | A1 | 6/2022 | Taylor et al. | |
| 2022/0295436 | A1 | 9/2022 | Alsina et al. | |
| 2022/0366077 | A1 | 11/2022 | Won et al. | |
| 2022/0394071 | A1 | 12/2022 | Nehlin et al. | |
| 2024/0346063 | A1 * | 10/2024 | Shenoy | H04N 21/8113 |

* cited by examiner

*Primary Examiner* — Haoshian Shih

(57) ABSTRACT

Stateless playback is performed by receiving a request from a media playback device, the request requesting a playback position associated with a collaborative media consumption session. Upon receiving the request, a playback position for the collaborative media consumption session is computed. The playback position is then communicated to the media playback device.

21 Claims, 6 Drawing Sheets

STATELESS PLAYBACK FOR COLLABORATIVE MEDIA CONSUMPTION

FIELD

Example aspects described herein relate generally to the field of media content delivery and, more specifically, to an architecture for providing stateless playback in a collaborative media consumption session.

BACKGROUND

Listening to music has long been a social activity, often enjoyed in the company of others at events such as concerts or parties. With the advent of music streaming platforms, this social aspect of music consumption has not been adequately replicated through technological means. While popular artists attract millions of simultaneous listeners when releasing new albums on digital music streaming platforms, there is currently no technology that effectively brings these listeners together and fosters a shared social experience.

A collaborative media consumption session (also referred to as a collaborative media consumption session or social listening session) generally refers to a video or audio playback experience in which multiple media playback devices, such as smartphones, tablets, smart televisions (TVs) or other devices, listen to the same media content.

One existing solution for enabling collaborative media consumption sessions involves live streaming, which is commonly used for live events such as sports matches or online concerts. However, live streams typically require prior scheduling and the presence of the artist to perform the content being streamed. Additionally, listeners must join the stream at a specific time, limiting the flexibility and spontaneity of social listening.

A variation of live streaming exists, where the artist's presence is not required for the stream to occur. However, scheduled streams still necessitate upfront preparation, including recording and scheduling, and participants (e.g., listeners, viewers) must still adhere to specific joining times. In addition, typical live stream collaborative media consumption sessions require that all participating devices play the same content at the same playback position to experience the live stream content in unison. This synchronization is typically achieved through a central server or system that coordinates the playback instructions for each individual device, allowing them to playback the media content in perfect harmony.

Remote group sessions allow users to join the same streaming session on their own devices. This solution offers the advantage of ad-hoc creation of collaborative media consumption sessions and some implementations enables participants to control playback functions independently. However, this solution is typically restricted to a maximum number of participants, hindering scalability. Furthermore, the underlying technology relies on storing references to all devices in a session, resulting in substantial storage requirements when scaling to a relatively larger number of users per session.

Thus, one technical problem is inadequate replication of social aspect of media content consumption. There is a need for a technical solution that effectively brings together simultaneous participants and fosters a shared social experience. Another technical problem is lack of flexibility and spontaneity. A technical solution is needed to overcome these limitations and provide more flexibility and spontaneity in collaborative media consumption. Yet another technical problem is scalability. A technical solution is needed to enable scalable social interactions among many streaming participants without such a limitation.

SUMMARY

Aspects of the embodiments described herein, aim to address the limitations of existing solutions by providing a system and method for enabling social music streaming. This approach facilitates a shared music listening experience among a large number of streaming listeners, effectively replicating the social aspect of listening to music in a virtual environment. By overcoming the storage limitations associated with current collaborative media consumption sessions, the proposed invention allows for scalability while providing enhanced control and interaction for participants.

In general terms, this disclosure id directed to methods, systems and non-transitory computer-readable products for providing stateless playback. One aspect is a method for performing stateless playback involves receiving a request from a media playback device, the request requesting a playback position associated with a collaborative media consumption session; upon receiving the request, computing a playback position for the collaborative media consumption session; and sending the playback position to the media playback device. In general terms, the playback position corresponds to a point in a sequence of one or more media content items where playback is currently paused or ongoing.

In some embodiments, the method comprises resolving the request to obtain a list of media content items associated with the collaborative media consumption session; obtaining a current time; obtaining a starting reference point; and computing the playback position according to:

$$\text{playback position} = (\text{now} - \text{reference})\ \%\ \sum \text{length}(i)$$

where now is the current time, reference is the starting reference point, length (i) is the length of a media content item in the list of media content items that is indexed by index i.

In some embodiments, the method comprises storing a playback context containing: a timestamp defining a time of a last update, a reference defining when the collaborative media consumption session was initiated, and a list of media content items associated with the collaborative media consumption session; receiving a request by a media playback device for a playback position subsequent to the storing of the playback context; computing the playback position based on a current time and the playback context; and sending to the media playback device the playback position in response to the request.

In some embodiments, computing the playback position is performed according to:

$$\text{playback position} = (\text{now} - \text{reference})\ \%\ \sum \text{length}(i)$$

where now is the current time, reference is the starting reference point, length (i) is the length of a media content item in the list of media content items that is indexed by index i.

In some embodiments, the method further comprises: detecting a change in a list of media content items associated with the collaborative media playback consumption session, thereby detecting a modified list of media content items; and computing an updated playback position based on the updated list of media content times. In a further aspect, when the change is detected, the method also performs playing the media content item currently playing until it ends, when the media content item currently playing has been removed from the list of media content items or moved within the list of media content items.

Another aspect is a system for performing stateless playback, comprising: a stateless position coordinator configured to: receive a request from a media playback device, the request requesting a playback position associated with a collaborative media consumption session; upon receiving the request, compute a playback position for the collaborative media consumption session; and send the playback position to the media playback device.

In some embodiments, the playback position coordinator further configured to: resolve the request to obtain a list of media content items associated with the collaborative media consumption session; obtain a current time; obtain a starting reference point; and compute the playback position according to:

$$\text{playback position} = (\text{now} - \text{reference}) \ \% \sum \text{length}(i)$$

where now is the current time, reference is the starting reference point, length (i) is the length of a media content item in the list of media content items that is indexed by index i.

In some embodiments, the stateless position coordinator further configured to: store a playback context containing: a timestamp defining a time of a last update, a reference defining when the collaborative media consumption session was initiated, and a list of media content items associated with the collaborative media consumption session; receive a request by a media playback device for a playback position subsequent to the storing of the playback context; compute the playback position based on a current time and the playback context; and send to the media playback device the playback position in response to the request. In a further aspect, computing the playback position is performed according to:

$$\text{playback position} = (\text{now} - \text{reference}) \ \% \sum \text{length}(i)$$

where now is the current time, reference is the starting reference point, length (i) is the length of a media content item in the list of media content items that is indexed by index i.

In some embodiments, the stateless position coordinator further configured to: detect a change in a list of media content items associated with the collaborative media playback consumption session, thereby detecting a modified list of media content items; and compute an updated playback position based on the updated list of media content times. In a further aspect, the stateless position coordinator further configured to: playing the media content item currently playing until it ends, when the media content item currently playing has been removed from the list of media content items or moved within the list of media content items.

Another aspect is a non-transitory computer-readable medium having stored thereon one or more sequences of instructions for causing one or more processors to perform the methods described herein. For example, in one embodiment there is described a non-transitory computer-readable medium having stored thereon one or more sequences of instructions for causing one or more processors to perform: receiving a request from a media playback device, the request requesting a playback position associated with a collaborative media consumption session; upon receiving the request, computing a playback position for the collaborative media consumption session; and sending the playback position to the media playback device. In general terms, the playback position corresponds to a point in a sequence of one or more media content items where playback is currently paused or ongoing.

In some embodiments, the non-transitory computer-readable medium further has stored thereon a sequence of instructions for causing the one or more processors to perform: resolving the request to obtain a list of media content items associated with the collaborative media consumption session; obtaining a current time; obtaining a starting reference point; and computing the playback position according to:

$$\text{playback position} = (\text{now} - \text{reference}) \ \% \sum \text{length}(i)$$

where now is the current time, reference is the starting reference point, length (i) is the length of a media content item in the list of media content items that is indexed by index i.

In some embodiments, the non-transitory computer-readable medium further has stored thereon a sequence of instructions for causing the one or more processors to perform: storing a playback context containing: a timestamp defining a time of a last update, a reference defining when the collaborative media consumption session was initiated, and a list of media content items associated with the collaborative media consumption session; receiving a request by a media playback device for a playback position subsequent to the storing of the playback context; computing the playback position based on a current time and the playback context; and sending to the media playback device the playback position in response to the request. In general terms, the playback position corresponds to a point in a sequence of one or more media content items where playback is currently paused or ongoing.

In a further aspect, the non-transitory computer-readable medium further has stored thereon a sequence of instructions for causing the one or more processors to perform, wherein computing the playback position is performed according to:

$$\text{playback position} = (\text{now} - \text{reference}) \ \% \sum \text{length}(i)$$

where now is the current time, reference is the starting reference point, length (i) is the length of a media content item in the list of media content items that is indexed by index i.

In some embodiments, the non-transitory computer-readable medium further has stored thereon a sequence of instructions for causing the one or more processors to perform: detecting a change in a list of media content items associated with the collaborative media playback consumption session, thereby detecting a modified list of media content items; and computing an updated playback position based on the updated list of media content times. In a further aspect, the non-transitory computer-readable medium further has stored thereon a sequence of instructions for causing the one or more processors to perform: playing the media content item currently playing until it ends, when the media content item currently playing has been removed from the list of media content items or moved within the list of media content items.

BRIEF DESCRIPTION OF DRAWINGS

The features and advantages of the example embodiments of the invention presented herein will become more apparent from the detailed description set forth below when taken in conjunction with the following drawings.

DESCRIPTION

Figure 1:
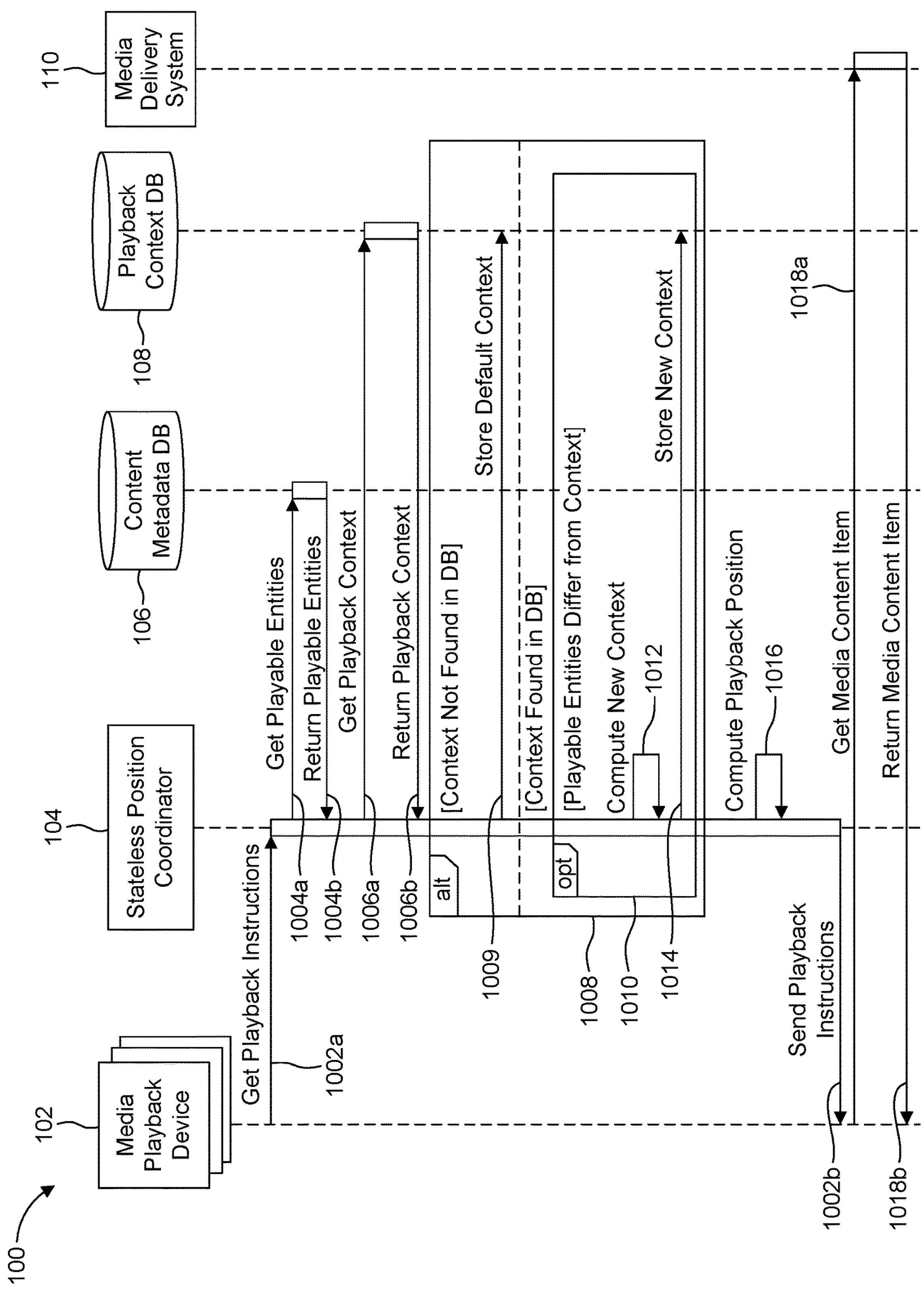
FIG. 1 is a system-flow diagram of a stateless playback architecture for performing stateless playback in a collaborative media consumption environment, according to an example embodiment.

An "edge device," as used herein, generally refers to a type of device that is located at the periphery of a network, closer to where data is generated, collected, or used. Edge devices, in some implementations, can be small, low-power devices that are designed to perform specific functions, such as collecting and processing data, or controlling other devices. Examples of edge devices include smart sensors, routers, gateways, smart televisions, and mobile devices. These devices are connected to the internet or a local network and can communicate with other devices or cloud-based services. In some implementations, the data associated with the edge device(s) is processed at the edge of a network, rather than in a central location. By processing data closer to where it is generated, edge devices can reduce latency and improve performance, as well as reduce the amount of data that needs to be transmitted to the cloud or other central location.

A "link" or "media content item identifier," as used herein, generally is a unique identifier that represents a specific piece of content on a media distribution platform. In some embodiments, it is a string of characters that includes a code that identifies content, such as a media content item or other identifiable type of content. A link such as a URI (uniform resource identifier), for example, can be used to share and link to content on a media distribution platform, and can be used in various ways such as embedding a media content item in a website, adding a media content item to a playlist, or sharing a link. For example, a Spotify URI for the song "Song Title" by Artist can be coded as "spotify: track: 7azZff4dY11W1lzX7mPBI3". This link uniquely identifies this song on the Spotify platform and can be used to access the song through the Spotify API or to share the song with others. A link is not limited to formats like URI; this link can be presented in other forms, such as scannable codes (e.g., QR codes or other machine-readable codes) or machine-readable audio cues (e.g., fingerprinted audio cues). A link can be shared independently in the forms described above or embedded within other types of communication messages (e.g., JSON and so on).

A "media content item" or "entity" as used herein, generally refers to an individual track, a video, an artist, an album, a playlist, a podcast, a radio station, a live recording, a DJ mix, a stream, and/or any other set of playable entity (also sometimes referred to interchangeably as "segments") that is playable by a media playback device. In some embodiments, a media content item identifier is used to locate the media content item. A media content time is sometimes also referred to as a "playable entity."

"Middleware," as used herein, generally refers to software that sits between two or more applications or systems, providing a communication layer that allows them to exchange data and interact with each other. Middleware acts as a bridge between applications, enabling them to share data and services without requiring them to know the details of each other's underlying architecture or programming languages. Middleware also refers to components used in distributed computing environments, where multiple applications or systems are spread across different machines or locations. Middleware can be used to provide a variety of services, such as message queuing, remote procedure calls, data caching, and transaction processing.

"Playback position," as used herein, generally refers to the point in a media content item or a group of media content items where playback is currently paused or ongoing. A media content item or a group of media content items is sometimes referred to individually and collectively as a "sequence of one or more media content items". This information can, for example, be stored as a timestamp, a frame number within the media file, or other marker that indicates the point where the content is paused, or playback is occurring. In the case of music playback, playback position would indicate, for example, the current point in a music track or a group of music tracks where the music is paused, or playback is occurring. This information can be used by media players and other applications to resume playback from the same position after an interruption, or to provide a visual representation of the music track's progress.

"Stateless," as used herein, generally means the absence of persistent state or memory related to prior client (e.g., media playback device) interactions. Every incoming client request is treated as an isolated and self-contained entity, encompassing all essential information needed for precise request processing and response generation.

A "stateless server", as used herein, refers to a server that does not store or rely on any local state information between client (e.g., media playback device) requests. In other words, each client request is treated in isolation, and the server does not remember any previous interactions with the client.

FIG. 1 is a system-flow diagram of a stateless playback architecture 100 for performing stateless playback in a collaborative media consumption environment, according to an example embodiment. The collaborative media consumption environment includes plural media playback devices 102 (each referred to as a media playback device 102), a stateless position coordinator 104, a content metadata database (DB) 106, a playback context database (DB) 108, and a media delivery system 110.

In some embodiments, the stateless position coordinator 104 is implemented in one of (i) an edge device, (ii) a remote server, or (iii) a middleware component.

As explained above, a collaborative media consumption session refers to an audio playback experience in which multiple media playback devices, such as smartphones, tablets, smart televisions (TVs) or other devices, listen to the same media content. Generally, aspects of the embodiments described herein provide a collaborative media consumption session that is stateless.

Generally, stateless position coordinator 104 operates to receive a request from a media playback device 102, as illustrated by get playback position operation 1002*a*. In turn, stateless position coordinator 104 provides the media playback device 102 playback instructions including a playback position for a media content item that is playable in a collaborative media consumption session with other media playback devices, as illustrated by send playback position operation 1002*b*. Instead of playing a media content item simultaneously for all the media playback devices 102 like a single stream, the stateless position coordinator 104 provides individual playback instructions to each media playback device 102.

The playback instructions are, in turn, used by each media playback device 102 to request media delivery system 110 to deliver an instance of the media content item. In some embodiments, the playback instructions include details for the media playback device 102 to prompt a media delivery system 110 for provisioning of a media content item and to play the media content item at an identical position as other media playback devices 102 participating in the same collaborative media consumption session. The playback instructions thus provide information that enables a media playback device 102 to instruct a media delivery system 110 to provide a media content item and play it at a synchronized position with other participating media playback devices 102 within the collaborative media consumption session without the need to coordinate across multiple participants of the collaborative media consumption session.

In an example implementation, the playback instructions communicated by stateless position coordinator 104 include a playback position. The playback position is computed by stateless position coordinator 104 upon receiving the request from the media playback device 102.

In addition, the playback instructions can include a media content item identifier that is used to locate one or more media content items.

In some embodiments, each media playback device 102 participating in the collaborative media consumption session operates to issue the request by performing a fetch operation 1002*a* (illustrated in FIG. 1 as "get playback instructions"). The fetch operation 1002*a* performs sending a request to the stateless position coordinator 104 to obtain the playback instructions corresponding to an existing collaborative media consumption session. The playback instructions can include, for example, a media content item identifier corresponding to a media content item, and the position within the media content item at which the group is listening. The media playback device 102, in some embodiments, also communicates to the stateless position coordinator 104 an account identifier that associates a user with an account with a media streaming service provider.

In some embodiments, stateless position coordinator 104 performs a get playable entities operation 1004*a* that involves communicating an instruction to content metadata DB 106 to perform a return playable entities operation 1004*b* that returns a list of media content items based on information contained in the request. The request can, for example, include a media content item identifier that is resolved by the stateless position coordinator 104 to reference one or more media content items (e.g., other media content item identifiers such as an album identifier, a playlist identifier, podcast identifier, or other identifier that points to one or more media content items). The get playable entities operation 1004*a*, in turn, performs retrieving a list of the one or more media content items associated located by the media content item identifier.

In some embodiments, the media content item identifier is a collaborative media session identifier that identifies a particular collaborative media consumption session. In other embodiments, the media content item identifier is independent of the collaborative media session identifier that identifies a particular collaborative media consumption session. In an example implementation, the request sent by the media playback device to the stateless position coordinator 104 during the fetch operation 1002*a* includes the collaborative media session identifier. The collaborative media consumption session identifier, in turn, is resolved by the stateless position coordinator 104 to reference one or more media content items. The get playable entities operation 1004*a*, in turn, performs retrieving one or more media content items based on the collaborative media consumption session identifier.

In some embodiments, the media playback device stores the media content item identifier. Alternatively, or in addition the media playback device stores the collaborative media consumption session identifier.

Metadata associated with the list of media content items can be stored in a content metadata database (DB) 106 and get playable entities operation 1004*a* and return playable entities operation 1004*b* causes this additional metadata to be returned to stateless position coordinator 104.

The stateless position coordinator 104 further operates to determine a so-called playback context for the collaborative media consumption session. "Playback context", as used herein, generally refers to data regarding a collaborative media consumption session.

In some cases, the playback context has been prestored in the playback context DB 108. In an example implementation, stateless position coordinator 104 determines the playback context by performing a get playback context operation 1006*a* to retrieve a prestored playback context from playback context DB 108. If a playback context for the collaborative media consumption session has been prestored in playback context DB 108, the playback context DB 108 performs a return playback context operation 1006*b* that involves returning the prestored playback context to the stateless position coordinator 104. In turn, stateless position coordinator 104 uses the prestored playback context to perform a playback position compute operation 1016 that involves computing a current playback position corresponding to the collaborative media consumption session associated with the playback context.

In turn, stateless position coordinator 104 performs sending playback instructions including the current playback position of the media content item to the media playback device 102, as illustrated by send playback instructions operation 1002*b*.

Transmitting the playback instructions of the collaborative media consumption session to the media playback device 102 that made the request, prompts that media playback device 102 to retrieve the corresponding media content item from the media delivery system 110 and playback the media content item at the playback position that has been computed by the stateless position coordinator 104, as illustrated by get media content item operation 1018*a* and return media content item operation 1018*b*. In some embodiments, get media content item operation 1018*a* involves seeking the current playback position of the media content item and return media content item operation 1018*b* involves retrieving the media content item by streaming it at the current playback position.

In some cases, the playback context has not been prestored in the playback context DB 108. In the case where a context is not found in the playback context DB 108, as illustrated by block 1008, stateless position coordinator 104 operates to store a default playback context in playback context DB 108, as illustrated by operation 1009. In an example implementation case, when a user, via a media playback device 102, opens a new collaborative media consumption session, the default playback context for that collaborative media consumption session is generated by stateless position coordinator 104. This user, also referred to as a first participant (or a host participant) thus uses a media playback device 102 to instruct the stateless position coordinator 104 to initializes a reference that defines when the collaborative media consumption session started. In an example embodiment, an initialization operation initializes the reference as the time when the collaborative media consumption session started.

In some embodiments, a media playback device 102 provides a media content item identifier to stateless position coordinator 104. In some embodiments, the media playback device 102 provides a collaborative media consumption session identifier to stateless position coordinator 104. In some embodiments, the media playback device 102 provides both a media content item identifier and a collaborative media consumption session identifier to stateless position coordinator 104, where the media content item identifier and the collaborative media consumption session identifier are different.

In some embodiments, when the collaborative media consumption session started, the media playback device 102 also causes the stateless position coordinator 104 to resolve the request to get media content items (get playable entities operation 1004*a* and return playable entities operation 1004*b*) and initializes the default playback context with the media content items that are returned by content metadata DB 106. In some embodiments, the default playback context is initialized with the media content item identifier that is associated with the media content items.

It may also be the case that the media content items in the media content items list supplied by the content metadata DB 106 differs from a list of media content items in a prestored playback context that the stateless position coordinator 104 retrieves from the playback context DB 108, as illustrated by update handler operation 1010. In such a case, stateless position coordinator 104 operates to compute a new playback context, as illustrated by compute new playback context operation 1012. Upon computing a new playback context, stateless position coordinator 104 stores the new playback context in playback context DB 108, as illustrated by operation 1014.

Once a playback context is known (e.g., a prestored playback context, a new playback context, or a default playback context), stateless position coordinator 104 computes a playback position as illustrated by playback position compute operation 1016. In turn, the stateless position coordinator 104 transmits the playback instructions including the playback position to media playback device 102, as illustrated by send playback instructions operation 1002*b*. Transmitting the playback instructions of the collaborative media consumption session to the media playback device 102 prompts that media playback device 102 to retrieve the corresponding media content item from the media delivery system 110 and playback the media content item at the playback position that has been computed by the stateless position coordinator 104, as illustrated by get media content item operation 1018*a* and return media content item operation 1018*b*. In some embodiments, get media content item operation 1018*a* involves seeking the current playback position of the media content item and return media content item operation 1018*b* involves retrieving the media content item by streaming it at the current playback position.

In some embodiments, only a subset of the participants in the collaborative media consumption session can modify the state of the collaborative media consumption session. In some embodiments, the subset of the participants is a single host of the collaborative media consumption session.

In some embodiments, once a collaborative media consumption session has commenced, the position of the playback in the list of media content items is set. A user can instruct their individual media playback device 102 to rewind, pause, skip, etc., the media content item playing on that user's individual media playback device 102, but such change in the playback of a media content item on that particular media playback device will not affect the state of the collaborative media consumption session. In addition, in some embodiments, the media content item that is playing is immutable meaning it cannot be changed during its playback. In some embodiments, even the host of the collaborative media consumption session cannot change (e.g., replace, skip, pause, etc.) the media content item currently playing in the collaborative media consumption session.

Benefits of the stateless position coordinator 104 according to the embodiments described herein include scalability, fault tolerance, flexibility, and simplicity, to name a few. The stateless position coordinator 104 is highly scalable because it does not require maintaining session states for each of the media playback devices 102. This allows for efficient distribution of requests across multiple server instances to handle high traffic loads. Since the server does not maintain client-specific state, it can easily recover from failures or restarts without affecting the overall system. Media playback devices 102 can reconnect and resume playback seamlessly. Media playback devices 102 can interact with different instances of the stateless position coordinator 104 without any constraints. They can request playback from any available stateless position coordinator 104, which simplifies load balancing and enables geographic distribution of content delivery. Aspects of the embodiments described herein utilize the stateless position coordinator 104 to avoid relying on broadcasting state update information to all participants of a synchronized playback session. As a result, the solution does not require storing the references to devices within the synchronized playback session.

In other words, stateless position coordinator 104 simulates a listening session without having to store information about the currently playing media content item. Instead, stateless position coordinator 104 computes information about the currently playing media content item based on the playback context.

The playback context can be automatically determined by the stateless position coordinator 104 and serves as a reference for managing and controlling the content played during the collaborative media consumption session. By maintaining the list of media content items and associated metadata (such as timestamp, reference, and index), the embodiments of the stateless playback architecture described herein can provide a consistent and synchronized playback experience for participants in the social playback session. As a result, neither manual upfront preparation nor having a host device is required to create a collaborative media consumption session. Additionally, the stateless position coordinator 104 operates to provide the playback position for the collaborative media consumption session indefinitely, enabling users to join the session at any point.

Figure 2:
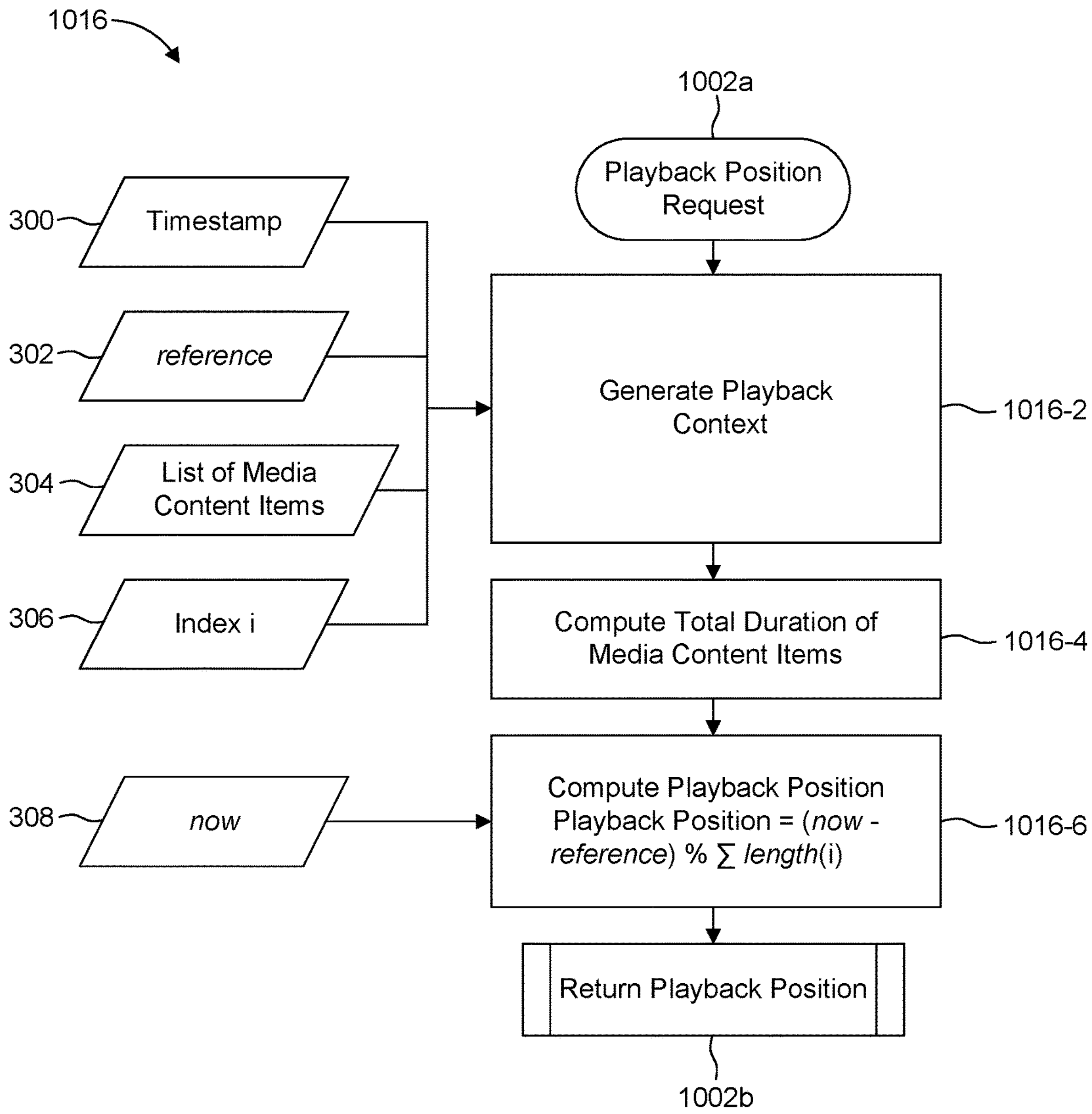
FIG. 2 illustrates an example playback position compute operation for computing a playback position based on a playback context, according to an example embodiment.
Figure 3:
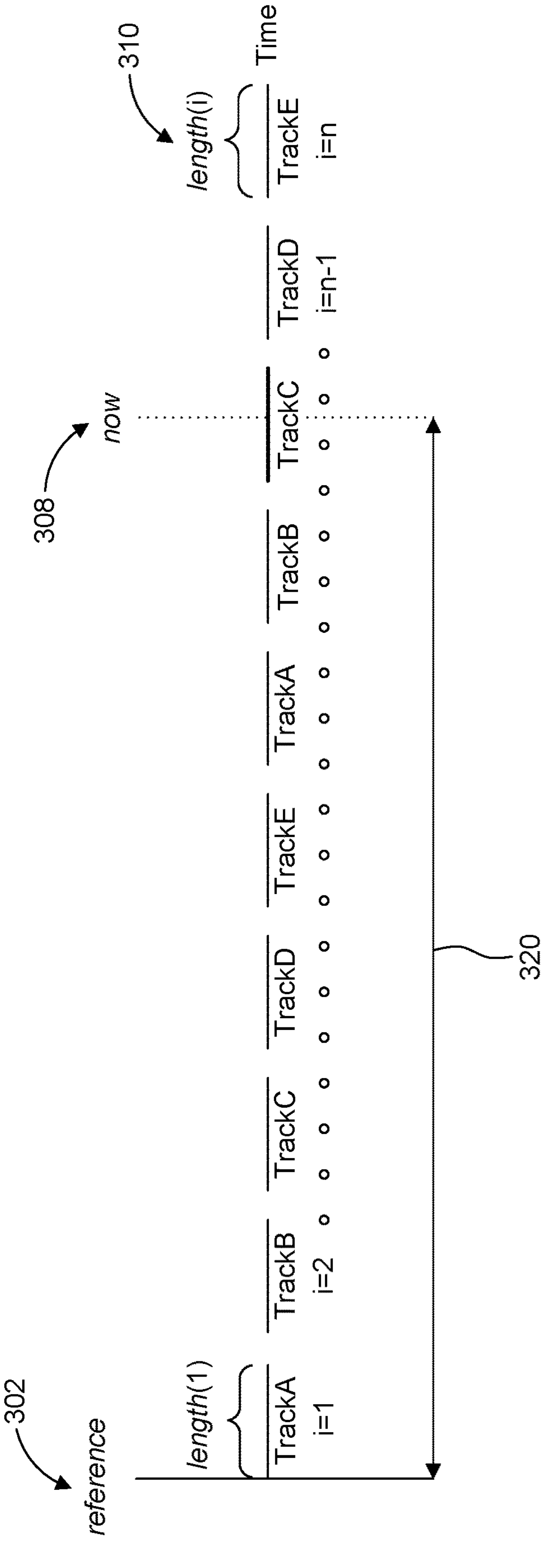
FIG. 3 illustrates a representation of media content items in a collaborative media consumption session and an indication of the playback position of the collaborative media consumption session.

FIG. 2 illustrates an example playback position compute operation 1016 for computing a playback position based on a playback context, according to an example embodiment. FIG. 3 illustrates a representation of media content items in a collaborative media consumption session and an indication of the playback position of the collaborative media consumption session. Computing the playback position is now described with reference to both FIG. 2 and FIG. 3.

In some embodiments, stateless position coordinator 104 operates to perform playback position compute operation 1016. In operation 1016-2, stateless position coordinator 104 performs generating a playback context by obtaining a timestamp 300, a reference 302, a list of media content items 304 and an index i 306. The following is an example structure for a playback context:

timestamp 300: <time of last update> reference 302: <when the collaborative media consumption session was initiated>.

list of media content items 304: <a list of playable content> [e.g., track A, track B, track C, track D]

index i 306: <position in a list of media content items from which a media playback device should start playing>

Timestamp 300 provides the time of the last update or modification to the playback context.

In some embodiments, the media playback device that is associated with the account of a host of the collaborative media consumption session controls the list of media content items that can be played by the participants of the collaborative media consumption session.

In some embodiments, the media playback device that is associated with one or more accounts of one or more moderators of the collaborative media consumption session control the list of media content items that can be played by the participants of the collaborative media consumption session.

Reference 302 provides a starting point or reference time when the collaborative media consumption session was initiated. The reference can be the time when the playback of the collaborative media consumption session began or any other relevant reference point. For example, reference can refer to a time stamp when a collaborative media consumption session is created initially or when an update in the collaborative media consumption session has occurred.

List of media content items 304 provides a collection of media content items. In some embodiments, the list of media content items 304 is obtained from content metadata DB 106 (FIG. 1) by resolving a collaborative media consumption session identifier. In the given example, the media content items are represented as track-type media content items: track A, track B, track C, and track D. These media content items can be any type of media content item that can be played during the collaborative media consumption session.

Index i 306 provides the position within the list of media content items 304 from which a collaborative media consumption session will start playing. In other words, the value of index i 306 specifies the starting media content item in the list of media content items 304.

The stateless position coordinator 104 further performs a total duration operation 1016-4 that performs computation of a total duration of media content items in the list of media content items 304.

Stateless position coordinator 104 performs a playback position computation operation 1016-6 that applies the playback context to a playback position seek function to determine a playback position. Advantageously, playback position computation operation 1016-6 can be performed without the need for manual upfront preparation or requiring a host media playback device to create a collaborative media consumption session. The stateless position coordinator 104 instead dynamically computes the playback position based on the playback context, allowing users to join the session at any time.

Stateless position coordinator 104 further operates to determine the current time, depicted in FIGS. 2 and 3 as now 308.

Equation (1) represents a position seek function for determining a playback position in a collaborative media consumption session:

$$\text{Playback Position} = (\text{now} - \text{reference}) \ \% \sum \text{length}(i) \tag{1}$$

Stateless position coordinator 104 operates, in some embodiments, to apply the position seek function described in equation (1) to compute the playback position.

In some embodiments, playback position is a timestamp within a playback timeline of a sequence of media content items (e.g., tracks). A media playback device will playback at the playback position (e.g., at the timestamp). Referring to FIG. 3, now 308 represents a point corresponding to the entity (e.g., track) currently being played. In an example implementation depicted in FIG. 3, now 308 represents the current time at which a position seek operation that performs the position determination is initiated. Reference 302 represents the starting reference point (e.g., initial timestamp) within a timeline of a group playback session. Thus, the time difference 320 between now 308 and reference 302 represents the time which the collaborative media consumption session has been playing.

Length (i) 310 refers to the length of each segment (e.g., track) in the sequence (e.g., a playlist, a track sequence, etc.), where i represents the index (e.g., an integer number n) of each segment in the sequence. Stateless position coordinator 104 operates, in some embodiments, to determine the length of each segment.

The symbol % denotes the modulo operator, which computes the remainder when the left operand (in this case, the time difference between now 308 and reference 302) is divided by the right operand "Σ length (i)" which is the sum of the lengths of all segments in the sequence (e.g., a playlist, a track sequence, etc.). Thus "Σ length (i)" is essentially the total duration of the media content items in the list of media content items that are playable.

Stated differently, equation (1) is executed by stateless position coordinator 104 to compute the time difference between the current time, now 308, and a reference point, reference 302, and to determine the position (e.g., timestamp) within the sequence playback timeline based on the lengths of the individual segments (e.g., tracks in the playlist). The modulo operation % in equation (1) operates to maintain the determined position within the range of the total duration of the sequence.

Handling Content Updates

Figure 4:
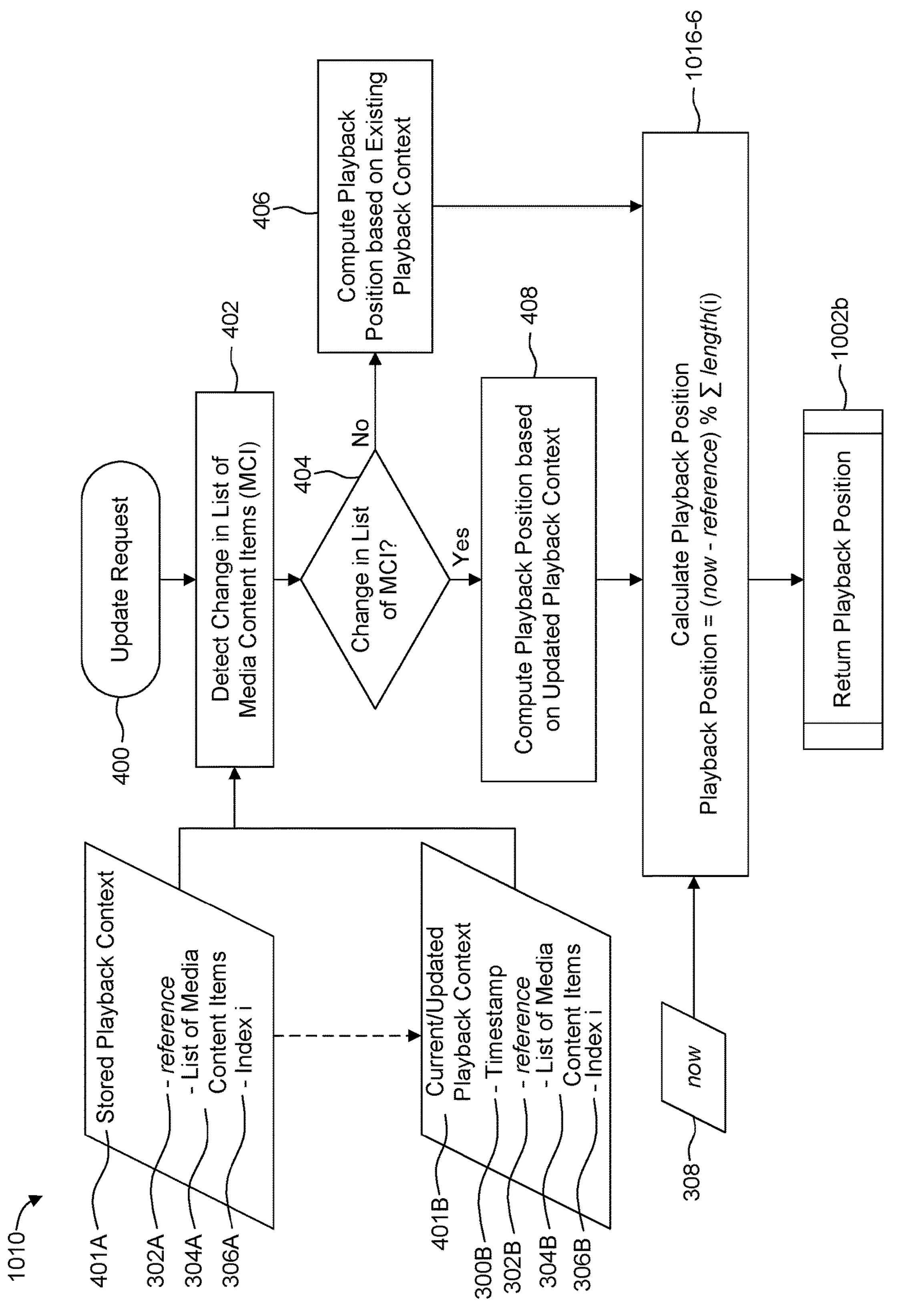
FIG. 4 illustrates a process for handling a content update during a collaborative media consumption session, according to an example embodiment.
Figure 5:
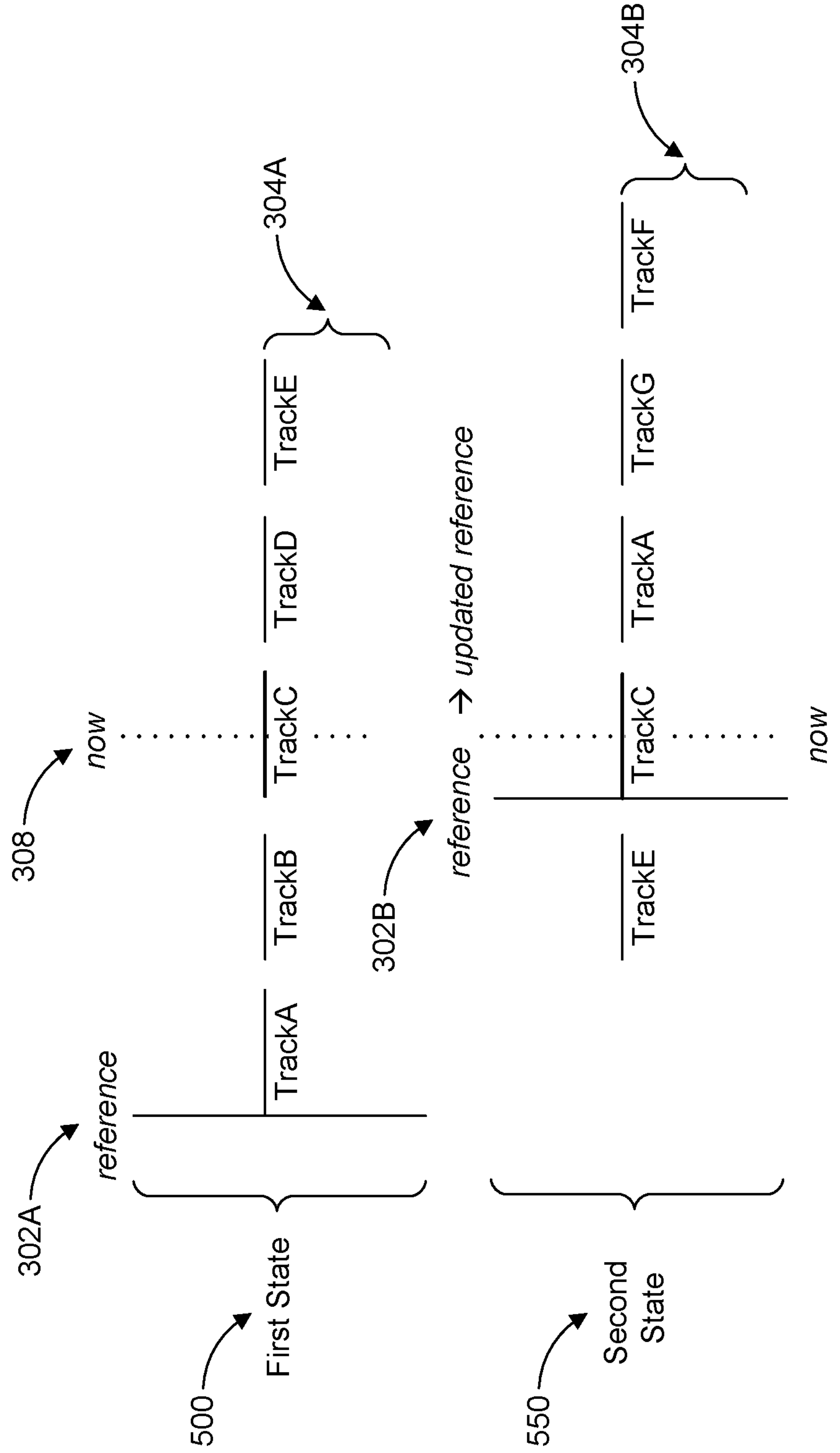
FIG. 5 illustrates a representation of media content items in a collaborative media consumption session in which a content update has occurred during a collaborative media consumption session.

FIG. 4 illustrates an update handler operation 1010 for handling a content update during a collaborative media consumption session, according to an example embodiment. FIG. 5 illustrates a representation of media content items in a collaborative media consumption session in which a content update has occurred during a collaborative media consumption session.

In some embodiments, a segment (e.g., track) that is being played by a particular media playback device 102 at any particular instance is immutable. That is, at any moment the segment being played will continue playing until the end, even if it has been swapped for another segment by another media playback device in the collaborative media consumption session. This is because each mobile playback device 102 is operating independently. Thus, in some use cases, after a segment (e.g., a track) has been played, the segment that is played next might not be in synchronization on each media playback device 102 in the collaborative media consumption session. One reason the segment that is played next might not be in synchronization on each media playback device 102 in the collaborative media consumption session is because there may have been changes to the list of media content items.

Media playback devices 102 can re-request the playback position after playing each segment (e.g., track) to update the current playback position of a collaborative media consumption session in the event the list of media content items in the collaborative media consumption session changes. In some embodiments, each media playback device 102 issues an update request 400 requesting an update at a predetermined time. An update request, in some embodiments, has the same structure as get playback position operation 1002*a* described above in connection with FIG. 1.

The predetermined time a media playback device 102 issues an update request can be, for example, at a predetermined interval of time, at the end of the current media content item being played back, within a playback period of a currently playing media content item, and the like.

In some embodiments stateless position coordinator 104 performs a change detection operation 402 that involves detecting changes in the list of media content items in a collaborative media consumption session. In an example implementation, stateless position coordinator 104 obtains a current playback context 401B including a current timestamp 300B and compares it to a prestored playback context 401A for the same collaborative media consumption session. Particularly, the prestored playback context 401A is obtained from the playback context DB 108 (i.e., the original source of the playback context). As shown in decision block 404, if a determination is made by the change detection operation 402 that there are no changes, the playback position is computed based on the pre-existing index 306A and pre-existing reference 302A obtained from the stored playback context 401A as illustrated by block 406. The playback position is computed by playback position computation operation 1016-6 as described above in connection with FIG. 2. Particularly, playback position computation operation 1016-6 computes a playback position for the current instant in time now 308 (current playback context) relative to reference 302A and index 306A retrieved from the stored playback context 401A.

In the example use case depicted in FIG. 5, in a first state 500, one or more media playback devices 102 are playing one of a plurality of media content items in an original list of tracks. In this example, media content item track C is being played back at a current playback position now 308. Reference 302A represents a starting reference point or initial timestamp within a timeline of the group playback session. Thus, the time difference between now 308 and reference 302A represents the time during which the collaborative media consumption session has been playing. In the example use case of FIG. 5, the original list of media content items 304A is track A, track B, track C, track D, track E.

In this example use case, while the one or more media playback devices 102 are playing one of the media content items in the list of media content items, track C, changes. Thus, the list of media content items in the collaborative media consumption session changes to an updated listed of media content items 304B and second state 550 as illustrated in FIG. 4 and FIG. 5, respectively. In this example, the updated list of media content items 304B corresponding to second state 550 includes track E, track C, track A, track G, track F. The update can be caused by, for example, a user with authorization to modify the list of media content items in the collaborative media consumption session (e.g., a user of a media playback device that is the host of the collaborative media consumption session). The update would cause the list of media content items in the content metadata DB 106 to be modified, thereby creating a modified list of media content items.

In some cases, the current playback context may contain an updated list of media content items. An updated playback context 401B (which is also referred to as a current playback context 401B that has been updated) is a playback context that includes a list of media content items that has been modified since the last time a playback context 401A was generated. When the state of the collaborative media consumption session changes from a first state 500 to a second state 550, any media playback device 102 that makes a request from the stateless position coordinator 104 will receive an updated playback context 401B. The updated playback context 401B will cause the media playback device 102 that has made the request to playback media content item track C until it ends. That is, the playback position now 308 will still point to a playback position as if there were no change in the list of media content items of the original playback context 401A. This is the case whether the media content items currently being played has been removed from the list of media content items or moved to another position within the list of media content items. Thus, the media content item currently playing will play until it ends, even when the media content item currently playing has been removed from the list of media content items or moved within the list of media content items.

As shown by decision block 408 of FIG. 4, if a determination is made by the change detection operation 402 that there are changes, the playback position is computed based on the updated playback context 401B and now 308 by playback position computation operation 1016-6.

The reference 302A (i.e., the original reference) that any media playback device 102 would have received had there not been a change, will now be updated to an updated reference 302B. The updated reference 302B will be moved to the beginning of the media content item that was being played prior to the change in the list of content items. After the currently played media content item ends, which in the example use case depicted in FIG. 5 is media content item track C, any subsequent track in the updated list of media content items (MCI) 304B will be played, which in this case is media content item track A. In other words, if a playback position of a collaborative media consumption session is within the timeframe of a particular media content item, referred to as a currently playing media content item, any request for a playback context including a playback position will continue to return a list of media content items including the currently playing media content item (in this case track C) and the playback position of that item, even if the list of media content items has changed and even if that content item was removed by a user with authorization to remove that currently played content time.

The playback position is returned to the media playback device 102 that made a request for the playback position, as illustrated by return playback position operation 1002*b*.

Unless there is another update to the playback context, the playback of the list of media content items will loop back to the beginning of the updated list of media content items 304B.

Figure 6:
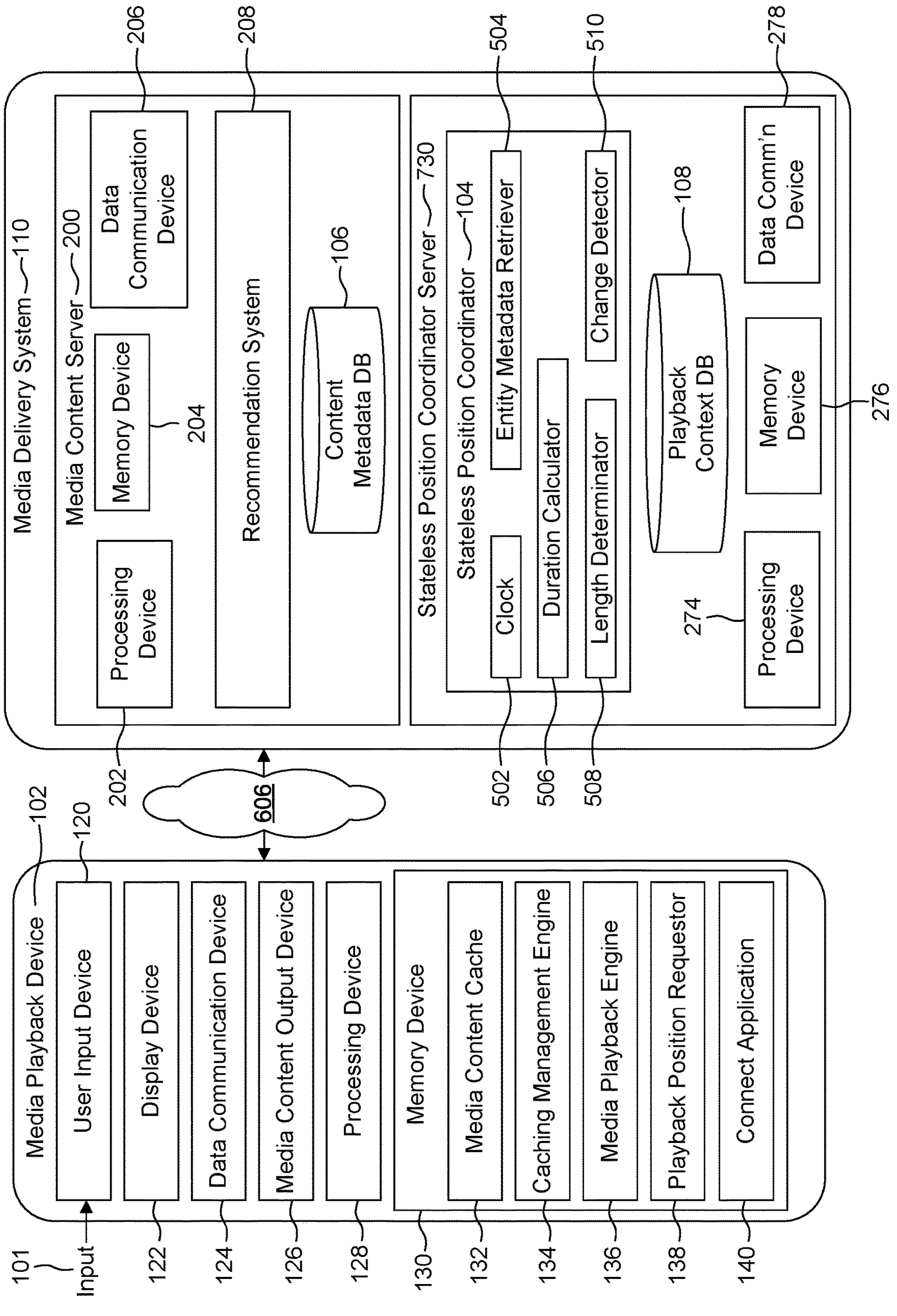
FIG. 6 is a representative view of a system in which some embodiments of the invention may be implemented.

FIG. 6 is a representative view of a system in which some embodiments of the invention may be implemented. The system includes a media playback device 102 and a media delivery system 110. The media delivery system 110 operates to provide media content to one or more media playback devices 102, such as the media playback device 102, via the network 606.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types. In some use cases, however, the media playback device 102 cannot playback all types of media content.

The media playback device 102 includes a user input device 120, a display device 122, a data communication device 124, a media content output device 126, a processing device 128, and a memory device 130.

The media playback device 102 operates to play media content. For example, the media playback device 102 is configured to play media content that is provided (e.g., streamed or transmitted) by a system external to the media playback device 102, such as the media delivery system 110, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smart speaker, smartphone, tablet, watch, wearable device, or any other type of computing device capable of playing certain types of media content (e.g., audio, video, text, etc.). In other embodiments, the media playback device 102 is a laptop computer, desktop computer, television, gaming console, set-top box, network appliance, blue-ray or DVD player, media player, stereo, or radio, etc.

A user input device 120 of media playback device 102 operates to receive a user input from a user for controlling the media playback device 102. The user input can include a manual input and/or a voice input. In some embodiments, the user input device 120 includes one or more buttons, keys, touch levers, switches, and/or other mechanical input devices for receiving the input 101.

In some embodiments, the user input device 120 can detect sounds including the voice input such as a voice of a user (e.g., an utterance) for controlling playback of media content via the media playback device 102.

In some embodiments, a display device 122 is provided that operates to display a graphical user interface that displays information for interacting with the media playback device 102. Examples of such information include media content playback information, notifications, and other information. In some embodiments, the display device 122 is configured as a touch sensitive display and includes the user input device 120 for receiving the input 101 from a selector (e.g., a finger, stylus etc.) controlled by a user. In some embodiments, therefore, the display device 122 operates as both a display device and a user input device.

The data communication device 124 operates to enable the media playback device 102 to communicate with one or more computing devices over one or more networks, such as the network 606. For example, the data communication device 124 is configured to communicate with the media delivery system 110 and receive media content from the media delivery system 110 at least partially via the network 606. The data communication device 124 can be a network interface of various types which connects the media playback device 102 to the network 606.

The media content output device 126 operates to output media content (e.g., via one or more speakers which are incorporated in the media playback device 102 or via external speaker such as headphones, a portal speaker, a vehicle entertainment system, etc.).

The processing device 128, in some embodiments, comprises one or more central processing units (CPU). In other embodiments, the processing device 128 additionally or alternatively includes one or more digital signal processors, graphical processing units (GPUs), field-programmable gate arrays, or other electronic circuits.

The memory device 130 typically includes at least some form of non-transitory computer-readable media. Non-transitory computer-readable media includes any available media that can be accessed by the media playback device 102, such as volatile and nonvolatile, removable and non-removable media implemented in any device configured to store information such as computer readable instructions, data structures, program modules, or other data. Memory device 130 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102 in a non-transitory manner.

The memory device 130 operates to store data and instructions. In some embodiments, the memory device 130 stores instructions for a caching management engine 134, a media playback engine 136, a playback position requestor 138, and a connect application 140.

Some embodiments of the memory device 130 include a media content cache 132. The media content cache 132 stores media content items, such as media content items that have been received from the media delivery system 110. In some embodiments, the media content cache 132 also stores metadata about media content items such as title, artist name, album name, length, genre, mood, era, etc. The media content cache 132 can further store playback information about the media content items and/or other information associated with the media content items.

The caching management engine 134 is configured to receive and cache media content in the media content cache 132 and manage the media content stored in the media content cache 132. In some embodiments, when media content is streamed from the media delivery system 110, the caching management engine 134 operates to cache at least a portion of the media content into the media content cache 132. In other embodiments, the caching management engine 134 operates to cache at least a portion of media content into the media content cache 132 while online so that the cached media content is retrieved for playback while the media playback device 102 is offline.

The media playback engine 136 operates to play media content to a user. As described herein, the media playback engine 136 is configured to communicate with the media delivery system 110 to receive one or more media content items (e.g., through a media stream). In other embodiments, the media playback engine 136 is configured to play media content that is locally stored in the media playback device 102.

In some embodiments, the media playback engine 136 operates to retrieve one or more media content items that are either locally stored in the media playback device 102 or remotely stored in the media delivery system 110. In some embodiments, the media playback engine 136 is configured to send a request to the media delivery system 110 for media content items and receive information about such media content items for playback.

In some embodiments, a playback position requestor 138 operates to request the media delivery system 110 to deliver a playback position for a collaborative media consumption session. In some use cases, the episode metadata also includes static-segment metadata.

In some embodiments, the connect application 140 operates to connect devices that also support a connect application. When two or more devices use a particular application, such as the connect application, to communicate with each other, they are compatible devices. Connect application 140, in some embodiments, includes instructions that, when executed by the one or more processing devices 128 of the media playback device 102, perform a connect-state service to provide information corresponding to client device including, for example, corresponding playback context information. In some embodiments, connect application 140 includes instructions that, when executed by the one or more processing devices 128 of the media playback device 102, perform a playback request operation to orchestrate the synchronization of a collaborative media consumption session.

Media delivery system 110 includes a media content server 200, a recommendation system 208, and a stateless position coordinator server 730.

Media delivery system 110 interacts with the media playback device 102 to provide the media playback device 102 with various functionalities.

In at least some embodiments, the media content server 200 and the stateless position coordinator server 730 (or components thereof) are provided by separate computing devices. In other embodiments, the media content server 200 and the stateless position coordinator server 730 are provided by the same computing device(s).

The media content server 200 transmits stream media to media playback devices such as the media playback device 102. In some embodiments, the media content server 200 includes a processing device 202, a memory device 204, and a data communication device 206. The processing device 202 and the memory device 204 may be similar to the processing device 128 and the memory device 130, respectively, which have each been previously described. Therefore, the description of the processing device 202 and the memory device 204 are omitted for brevity purposes.

The data communication device 206 operates to communicate with other computing devices over one or more networks, such as the network 606. Examples of the data communication device include one or more wired network interfaces and wireless network interfaces.

In some embodiments, media content server 200 executes a media server application configured to stream media content, such as music or other audio, video, or other suitable forms of media content. The media server application can include a media stream service that operates to buffer media content, such as media content items, for streaming to one or more media streams.

The media content server 200 can receive requests or other communication from media playback devices or other systems, such as the media playback device 102, to retrieve media content items from the media content server 200.

In some embodiments, media content server 200 stores media content items, media content metadata, media contexts, user accounts, and taste profiles.

Media content items may be audio, video, podcasts or any other type of media content, which may be stored in any data format for storing media content.

Media content metadata, as used herein, provides various information (also referred to herein as attribute(s)) associated with the media content items. In addition, or alternatively, the media content metadata provides various information associated with the media contexts. In some embodiments, the media content metadata includes one or more of title, artist name, album name, length, genre, mood, era, etc.

Media contexts can include playlists. The playlists are used to identify one or more of the media content items. In some embodiments, the playlists identify a group of the media content items in a particular order. In other embodiments, the playlists merely identify a group of the media content items without specifying a particular order. Some, but not necessarily all, of the media content items included in a particular one of the playlists are associated with a common characteristic such as a common genre, mood, or era.

In some embodiments, a user can listen to media content items in a playlist by selecting the playlist via a media playback device, such as the media playback device 102. The media playback device 102 then operates to communicate with the media delivery system 110 so that the media delivery system 110 retrieves the media content items identified by the playlist and transmits data for the media content items to the media playback device for playback.

In some embodiments, the playlist includes one or more playlist descriptions. The playlist descriptions include information associated with the playlist. The playlist descriptions can include a playlist title. In some embodiments, the playlist title can be provided by a user using the media playback device 102. In other embodiments, the playlist title can be provided by a media content provider (or a media-streaming service provider). In yet other embodiments, the playlist title can be automatically generated.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist includes a list of media content item identifications (IDs). The list of media content item identifications includes one or more media content item identifications that refer to respective media content items. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata, which can further include other attributes of the media content item, such as album name, length, genre, mood, era, etc. as described herein.

At least some of the playlists may include user-created playlists. For example, a user of a media streaming service provided using the media delivery system 110 can create a playlist and edit the playlist by adding, removing, and rearranging media content items in the playlist. A playlist can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 110 operates to generate a list of media content items recommended for the particular user or the particular group of users. In some embodiments, such recommended media content items can be selected based at least on the taste profiles as described herein. Other information or factors can be used to determine the recommended media content items.

In addition, or alternatively, at least some of the playlists are created by a media streaming service provider. For example, such provider-created playlists can be automatically created by the media delivery system 110. In some embodiments, a provider-created playlist can be customized to a particular user or a particular group of users. By way of example, a playlist for a particular user can be automatically created by the media delivery system 110 based on the user's listening history (e.g., the user's taste profile) and/or listening history of other users with similar tastes. In other embodiments, a provider-created playlist can be configured to be available for the public in general. Provider-created playlists can also be sharable with other users.

Referring still to FIG. 6, in some embodiments, stateless position coordinator server 730 includes a stateless position coordinator 104 and a playback context DB 108. In some embodiments, the stateless position coordinator server 730 includes content metadata DB 106. In other embodiments, as shown in FIG. 6, media content server 200 hosts the content metadata DB 106. While in the example embodiment depicted in FIG. 6, stateless position coordinator 104 is embodied in a remote server such as stateless position coordinator server 730, it should, in some embodiments, the stateless position coordinator 104 is implemented in any one or a combination of an edge device, a remote server, and a middleware component.

In some embodiments, stateless position coordinator 104 includes a clock 502, an entity metadata retriever 504, a duration calculator 506, a length determinator 508, and a change detector 510.

In an example implementation, clock 502 operates to obtain a time that is used as the timestamp 300, described above in connection with FIG. 2, FIG. 3, FIG. 4 and FIG. 5.

In an example implementation, clock 502 also operates to obtain a time that is used as the reference 302, described above in connection with FIG. 2, FIG. 3, FIG. 4 and FIG. 5.

In an example implementation, entity metadata retriever 504 operates to obtain a list of media content from content metadata DB 106 and the starting position (i.e., index i 306) of the list of media content items 304, described above in connection with FIG. 2, FIG. 3, FIG. 4 and FIG. 5.

Duration calculator 506 operates to compute the duration of the list of media content items, described above in connection with FIG. 2, FIG. 3, FIG. 4 and FIG. 5.

In an example implementation, clock 502 also operates to obtain a time that is used as now 308, described above in connection with FIG. 2, FIG. 3, FIG. 4 and FIG. 5.

In an example implementation, length determinator 508 operates obtain the length of each segment (e.g., track) in the sequence (e.g., a playlist, a track sequence, etc.), described above in connection with FIG. 2, FIG. 3, FIG. 4 and FIG. 5.

In an example implementation, change detector 510 operates detect changes in the list of media content items in a collaborative media consumption session as illustrated in connection with FIG. 4 and FIG. 5.

In some embodiments, the stateless position coordinator server 730 includes a processing device 274, a memory device 276, and a data communication device 278. The processing device 274, the memory device 276, and the data communication device 278 for stateless position coordinator server 730 may be similar to the processing device 202, the memory device 204, and the data communication device 206, respectively, which have each been previously described.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments but should be defined only in accordance with the following claims and their equivalents.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular examples only and is not intended to be limiting. As used herein, the singular forms "a", "an" and "the" are intended to include the plural forms as well, unless the context clearly indicates otherwise.

Illustrative examples of the disclosure are described below. In the interest of clarity, not all features of an actual implementation are described in this specification. It will of course be appreciated that in the development of any such actual example, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Software embodiments of the example embodiments presented herein may be provided as a computer program product, or software, that may include an article of manufacture on a machine accessible or machine-readable medium having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The performance of the one or more actions enables enhanced and automated selection and output of the data corresponding to media content. This means that data which is selected and output according to the processes described herein are of enhanced contextual relevance and in this regard can be automatically selected and output at significantly improved rates, for example, the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for performing stateless playback, the method comprising:

receiving a request from a media playback device, the request requesting a playback position associated with a collaborative media consumption session;

in response to receiving the request, computing a particular playback position for the collaborative media consumption session, wherein the particular playback position is computed using a stateless computation isolated from previous interactions with the media playback device; and sending the particular playback position to the media playback device.

2. The method of claim 1, wherein the particular playback position corresponds to a point in a sequence of one or more media content items where playback is currently paused or ongoing.

3. The method according to claim 1, further comprising:

resolving the request to obtain a list of media content items associated with the collaborative media consumption session;

obtaining a current time;

obtaining a starting reference point; and computing the particular playback position according to: particular $$\text{playback position} = (\text{now} - \text{reference})\ \%\ \sum \text{length}(i)$$

where now is the current time, reference is the starting reference point, length (i) is a length of a media content item in the list of media content items that is indexed by index i.

4. The method according to claim 1, further comprising:

storing a playback context containing:

a timestamp defining a time of a last update, a reference defining when the collaborative media consumption session was initiated, and a list of media content items associated with the collaborative media consumption session;

receiving a second request by a second media playback device for a playback position subsequent to the storing of the playback context;

computing a second particular playback position based on a current time and the playback context; and sending to the second media playback device the second particular playback position in response to the second request.

5. The method according to claim 4, wherein computing the second particular playback position is performed according to:

second particular $$\text{playback position} = (\text{now} - \text{reference})\ \%\ \sum \text{length}(i)$$

where now is the current time, reference is a starting reference point, length (i) is a length of a media content item in the list of media content items that is indexed by index i.

6. The method according to claim 1, further comprising:

detecting a change in a list of media content items associated with the collaborative media consumption session, wherein detecting the change corresponds to detecting a modified list of media content items; and computing an updated playback position based on the modified list of media content items.

7. The method according to claim 6, further comprising:

playing a currently playing media content item until completion when the currently playing media content item has been removed from the list of media content items or when the currently playing media content item has been moved within the list of media content items.

8. A system for performing stateless playback, system comprising:

a memory;

a processor coupled to the memory, the processor comprising a stateless position coordinator configured to:

receive a request from a media playback device, the request requesting a playback position associated with a collaborative media consumption session;

in response to receiving the request, compute a particular playback position for the collaborative media consumption session, wherein the particular playback position is computed using a stateless computation isolated from previous interactions with the media playback device; and send the particular playback position to the media playback device.

9. The system of claim 8, wherein the particular playback position corresponds to a point in a sequence of one or more media content items where playback is currently paused or ongoing.

10. The system according to claim 8, wherein the playback position coordinator is further configured to:

resolve the request to obtain a list of media content items associated with the collaborative media consumption session;

obtain a current time;

obtain a starting reference point; and compute the particular playback position according to:

particular $$\text{playback position} = (\text{now} - \text{reference})\ \%\ \sum \text{length}(i)$$

where now is the current time, reference is the starting reference point, length (i) is a length of a media content item in the list of media content items that is indexed by index i.

11. The system according to claim 8, wherein the stateless position coordinator is further configured to:

store a playback context containing:

a timestamp defining a time of a last update, a reference defining when the collaborative media consumption session was initiated, and a list of media content items associated with the collaborative media consumption session;

receive a second request by a second media playback device for a playback position subsequent to the storing of the playback context;

compute a second particular playback position based on a current time and the playback context; and send to the second media playback device the second particular playback position in response to the second request.

12. The system according to claim 11, wherein computing the second particular playback position is performed according to:

second particular $$\text{playback position} = (\text{now} - \text{reference})\ \%\ \sum \text{length}(i)$$

where now is the current time, reference is a starting reference point, length (i) is a length of a media content item in the list of media content items that is indexed by index i.

13. The system according to claim 8, wherein the stateless position coordinator is further configured to:

detect a change in a list of media content items associated with the collaborative media consumption session, wherein detecting the change corresponds to detecting a modified list of media content items; and compute an updated playback position based on the modified list of media content items.

14. The system according to claim 13, wherein the stateless position coordinator further configured to:

play a currently playing media content item until completion when the currently playing media content item has been removed from the list of media content items or when the currently playing media content item has been moved within the list of media content items.

15. A non-transitory computer-readable medium having stored thereon one or more sequences of instructions for causing one or more processors to perform operations comprising:

receiving a request from a media playback device, the request requesting a playback position associated with a collaborative media consumption session;

in response to receiving the request, computing a particular playback position for the collaborative media consumption session, wherein the particular playback position is computed using a stateless computation isolated from previous interactions with the media playback device; and sending the particular playback position to the media playback device.

16. The non-transitory computer-readable medium of claim 15, wherein the particular playback position corresponds to a point in a sequence of one or more media content items where playback is currently paused or ongoing.

17. The non-transitory computer-readable medium of claim 15, wherein the operations further comprise:

resolving the request to obtain a list of media content items associated with the collaborative media consumption session;

obtaining a current time;

obtaining a starting reference point; and computing the particular playback position according to: particular $$\text{playback position} = (\text{now} - \text{reference})\ \%\ \sum \text{length}(i)$$

where now is the current time, reference is the starting reference point, length (i) is a length of a media content item in the list of media content items that is indexed by index i.

18. The non-transitory computer-readable medium of claim 15, wherein the operations further comprise:

storing a playback context containing:

a timestamp defining a time of a last update, a reference defining when the collaborative media consumption session was initiated, and a list of media content items associated with the collaborative media consumption session;

receiving a second request by a second media playback device for a playback position subsequent to the storing of the playback context;

computing a second particular playback position based on a current time and the playback context; and sending to the second media playback device the second particular playback position in response to the second request.

19. The non-transitory computer-readable medium of claim 18, wherein computing the second particular playback position is performed according to:

second particular $$\text{playback position} = (\text{now} - \text{reference})\ \%\ \sum \text{length}(i)$$

where now is the current time, reference is a starting reference point, length (i) is a length of a media content item in the list of media content items that is indexed by index i.

20. The non-transitory computer-readable medium of claim 15, wherein the operations further comprise:

detecting a change in a list of media content items associated with the collaborative media consumption session, wherein detecting the change corresponds to detecting a modified list of media content items; and computing an updated playback position based on the modified list of media content items.

21. The non-transitory computer-readable medium of claim 20, wherein the operations further comprise:

playing a currently playing media content item until completion when the currently playing media content item has been removed from the list of media content items or when the currently playing media content item has been moved within the list of media content items.

* * * * *